United States Patent
Schneider

(10) Patent No.: US 8,360,630 B2
(45) Date of Patent: Jan. 29, 2013

(54) MIXING ELEMENT FOR A STATIC MIXER AND PROCESS FOR PRODUCING SUCH A MIXING ELEMENT

(75) Inventor: Gottlieb Schneider, Seuzach (CH)

(73) Assignee: Stamixco Technology AG (CH)

( * ) Notice: Subject to any disclaimer, the term of this patent is extended or adjusted under 35 U.S.C. 154(b) by 1063 days.

(21) Appl. No.: 12/278,191

(22) PCT Filed: Jan. 31, 2007

(86) PCT No.: PCT/EP2007/050942
§ 371 (c)(1),
(2), (4) Date: Dec. 1, 2008

(87) PCT Pub. No.: WO2007/090777
PCT Pub. Date: Aug. 16, 2007

(65) Prior Publication Data
US 2012/0134232 A1    May 31, 2012

(30) Foreign Application Priority Data
Feb. 7, 2006    (EP) .................................... 06101392

(51) Int. Cl.
*B01F 5/06*    (2006.01)
(52) U.S. Cl. ........................................ 366/337
(58) Field of Classification Search ................ 366/336, 366/337, 338, 339
See application file for complete search history.

(56) References Cited

U.S. PATENT DOCUMENTS

| | | | | |
|---|---|---|---|---|
| 3,827,676 A | * | 8/1974 | Brasie | 366/337 |
| 3,860,217 A | * | 1/1975 | Grout | 366/336 |
| 3,861,652 A | * | 1/1975 | Clark et al. | 366/336 |
| 3,953,002 A | * | 4/1976 | England et al. | 366/322 |
| 4,072,296 A | * | 2/1978 | Doom | 366/337 |
| 4,093,188 A | * | 6/1978 | Horner | 366/336 |
| 4,296,779 A | * | 10/1981 | Smick | 138/38 |
| 4,313,680 A | * | 2/1982 | Honnen | 366/337 |

(Continued)

FOREIGN PATENT DOCUMENTS

CH    693560    10/2003
DE    2262016.2    6/1974

(Continued)

OTHER PUBLICATIONS

Schmidt, Alexander. "Gut gemischt." Kunststoffe, Feb. 2004, pp. 44-46. Carl Hanser Verlag, Munich, Germany.

(Continued)

*Primary Examiner* — Tony G Soohoo
(74) *Attorney, Agent, or Firm* — Fish & Associates, PC

(57) ABSTRACT

The mixer insert (2) for a static mixer (1) extends in one longitudinal direction (L), the mixer insert (2) having a multitude of elements (2e) running transverse to the longitudinal direction (L) and at least two longitudinal supports (2f) running in longitudinal direction (L), and the static mixer insert (2) consisting of a multitude of base elements (2a, 2b, 2c, 2d) arranged alongside one another in longitudinal direction (L), each base element (2a, 2b, 2c, 2d) comprising a longitudinal support (2f), and the base elements (2a, 2b, 2c, 2d) and their longitudinal supports (2f) being arranged relative to one another such that a longitudinal support (2f) running over the entire length of the mixer insert (2) is present, and base elements (2a, 2b, 2c, 2d) arranged alongside one another are bonded to one another in a fixed manner at least via the longitudinal supports (2f).

18 Claims, 7 Drawing Sheets

U.S. PATENT DOCUMENTS

| | | | | |
|---|---|---|---|---|
| 4,352,378 A | * | 10/1982 | Bergmann et al. | 138/38 |
| 4,494,878 A | * | 1/1985 | Rainey, Jr. | 366/341 |
| 4,614,440 A | * | 9/1986 | King | 366/336 |
| 4,765,204 A | * | 8/1988 | Buchholz et al. | 76/101.1 |
| 4,784,218 A | * | 11/1988 | Holl | 165/109.1 |
| 5,368,382 A | * | 11/1994 | Kawasaki et al. | 366/2 |
| 5,407,274 A | * | 4/1995 | Woerheide et al. | 366/337 |
| 5,470,150 A | * | 11/1995 | Pardikes | 366/137 |
| 5,547,281 A | * | 8/1996 | Brooks | 366/340 |
| 5,620,252 A | * | 4/1997 | Maurer | 366/337 |
| 5,688,047 A | * | 11/1997 | Signer | 366/337 |
| 5,709,468 A | * | 1/1998 | Woerheide et al. | 366/337 |
| 5,800,058 A | * | 9/1998 | Cook | 366/306 |
| D405,813 S | * | 2/1999 | Chesser | D15/147 |
| 6,109,781 A | * | 8/2000 | Ogasawara et al. | 366/336 |
| 6,164,813 A | * | 12/2000 | Wang | 366/339 |
| 6,623,155 B1 | * | 9/2003 | Baron | 366/181.5 |
| 6,769,800 B1 | * | 8/2004 | Young | 366/306 |
| 6,769,801 B1 | * | 8/2004 | Maurer et al. | 366/337 |
| 2005/0062185 A1 | | 3/2005 | Piedboeuf | |

FOREIGN PATENT DOCUMENTS

| | | |
|---|---|---|
| DE | 3618062.9 | 12/1987 |
| EP | 0727249 B1 | 2/1995 |
| GB | 2271725 A | 4/1994 |

OTHER PUBLICATIONS

Baker, Jim R. "Motionless Mixers Stir Up New Uses." Chemical Engineering Progress, Jun. 1991, No. 6, pp. 32-38. New York.

Michel, Olaf. "Statische Mischer in der Kunststofftechnik." Kunststoffe, Jul. 2002, pp. 80-81. Carl Hanser Verlag, Munich, Germany.

* cited by examiner

MIXING ELEMENT FOR A STATIC MIXER AND PROCESS FOR PRODUCING SUCH A MIXING ELEMENT

FIELD OF THE INVENTION

The invention relates to a mixer insert for a static mixer and methods of manufacture therefore.

BACKGROUND OF THE INVENTION

The document EP 0727249 discloses a static mixer for the mixing of highly viscous media. The static mixer includes a tube and also a mixer insert arranged within the tube. The mixer insert is also termed a mixing element. A disadvantage of this mixer is the fact that the manufacture of the mixer insert is very complicated and thus costly. A disadvantage is moreover the fact that the mixer insert has ribs at its periphery extending in the longitudinal direction to the tube wall which serve to reinforce the mixer in the axial direction against the pressure drop forces which likewise occur in the axial direction along which a medium to be mixed can flow in the axial direction unhindered through the boundary regions in which the longitudinal ribs extend which considerably reduces the mixing quality of the mixer.

SUMMARY OF THE INVENTION

It is the object of the present invention to propose an economically more advantageous mixer insert, a more advantageous static mixer and also a more advantageous method for the manufacture of a mixer insert.

This object is satisfied in a mixer insert for a static mixer wherein the mixer insert extends in a longitudinal direction and wherein the mixer insert has a plurality of bars extending transverse to the longitudinal direction as well as at least two longitudinal supports extending in the longitudinal direction, characterized in that the static mixer insert consists of a plurality of basic elements arranged lying next to one another in the longitudinal direction, with each basic elements including a longitudinal support and wherein the basic elements and their longitudinal supports are mutually arranged such that a longitudinal support extending over the total length of the mixer insert is formed, with basic elements arranged lying next to one another being firmly connected together at least via the longitudinal supports.

The object is in particular satisfied with a mixer insert for a static mixer wherein the mixer insert extends in a longitudinal direction and wherein the mixer insert has a plurality of bars extending transverse to the longitudinal direction as well as at least two longitudinal supports extending in the longitudinal direction, and wherein the static mixer insert consists of a plurality of basic elements arranged lying next to one another in the longitudinal direction, with each basic elements including a longitudinal support and wherein the basic elements and their longitudinal supports are mutually arranged such that a longitudinal support extending over the total length of the mixer insert is formed, with basic elements arranged lying next to one another being firmly connected together at least via the longitudinal supports.

The object is, moreover, preferably satisfied with a method of manufacturing a mixer insert wherein basic elements of an easily fusible material are produced, wherein a plurality of basic elements are arranged mutually contacting one another and lying next to one another in a longitudinal direction, wherein the basic elements are thereafter clad, wherein the basic elements are thereafter removed by melting so that hollow cavities are formed by the no longer present basic elements, and wherein a liquid material, which subsequently solidifies, is supplied to the hollow cavities such that a monolithic mixer insert arises which essentially has the form determined by the basic elements.

A metal, a casting resin or a plastic, in particular a thermo-setting plastic is preferably used as a liquid material which subsequently solidifies.

In a preferred embodiment the longitudinal supports of the mixer inserts are arranged extending within the flow cross-section and are preferably spaced with respect to the outer contour of the mixer insert.

The mixer insert of the invention has the advantage that it can be manufactured at favorable cost. The basic elements can in particular be manufactured at favorable cost and with simple tools. Moreover, the mixer insert can be manufactured at favorable cost in a multitude of different designs. The mixer insert has a plurality of longitudinal supports extending in the longitudinal direction which endows the mixer insert with a high strength. Since these longitudinal supports preferably extend within, i.e. removed from, the periphery of the flow cross-section of the tube wall and since no mixing element bars have to be removed for the execution of these longitudinal supports, no material can flow unhindered within the mixer construction and also not along the tube wall and thus negatively influence the mixing result. These longitudinal supports, together with a suitable choice of material, permit the thickness of the mixing element bars to be reduced to a minimum with a high strength, to maximize the empty volume of the mixing elements and to thereby minimize the flow resistance. The mixer insert is thus also not deformed even at high pressure drops. The basic elements lying alongside one another are firmly connected together in an advantageous design at least via the longitudinal supports which contact one another, for example by adhesive bonding, soldering or welding. In a further advantageous embodiment the mixer insert is designed as a monolithic component and thus has a high strength, in particular in the longitudinal direction. The term "monolithic component" will be understood to mean a component that has no weakened points due to joints, for example soldered connections. The monolithic component consists preferably of a metallic casting alloy with high strength values, or a plastic such as a thermoplastic, or a thermo-setting plastic, or a ceramic, and is formed of a single piece.

If the monolithic mixer insert consists of metal, then it is as a rule a precision cast part which is preferably cast using a lost wax process. The hollow form manufactured by the lost wax process has longitudinal supports extending in the longitudinal direction which are connected to the transversely extending bars in such a way that the melt that is introduced is reliably supplied to all hollow cavities of the hollow mould. The mixer insert can however, for example, also be manufactured by means of a metal powder injection-casting process. In this process a green part is manufactured by means of injection molding from a mixture of metal powder and organic substances. Thereafter, the organic substances are largely thermally removed and the green part, in which the metallic components still stick to one another, is densely sintered to an end form. The mixer insert could, however, also be manufactured as a ceramic part. For use in chemical reactors, the parts can be additionally coated with catalytically active layers, or ceramic compositions can be doped with catalytically active components.

In a preferred design, the mixer insert is arranged in a container with projecting supports, with the longitudinal supports of the mixer insert lying on the supports of the container so that the forces acting on the mixer insert are transmitted to the container at defined positions. This arrangement likewise reduces the danger that the mixer insert could be deformed. This arrangement has, moreover, the advantage that all connection points have a common form which is favorable flow-wise because the starting parts can, for example, be cast from an easily fusible material such as wax by means of a tool, the mixer insert can be removed in simple manner from the container, its open structure can be more simply and quickly cleaned and for example can be controlled well, or indeed replaced.

The mixer insert in accordance with the invention has moreover the advantage that it does not have any significant flow obstacles such as large, bulky or misshapen welding points to which the fluids, in particular viscous fluids, could stick during the throw-flow. In this way it is precluded that fluids dwell for a long time at the same point and could indeed decompose, for example with temperature-sensitive polymers.

The invention will now be explained in more detail with reference to embodiments. The figures show:

DETAILED DESCRIPTION

Figure 1:
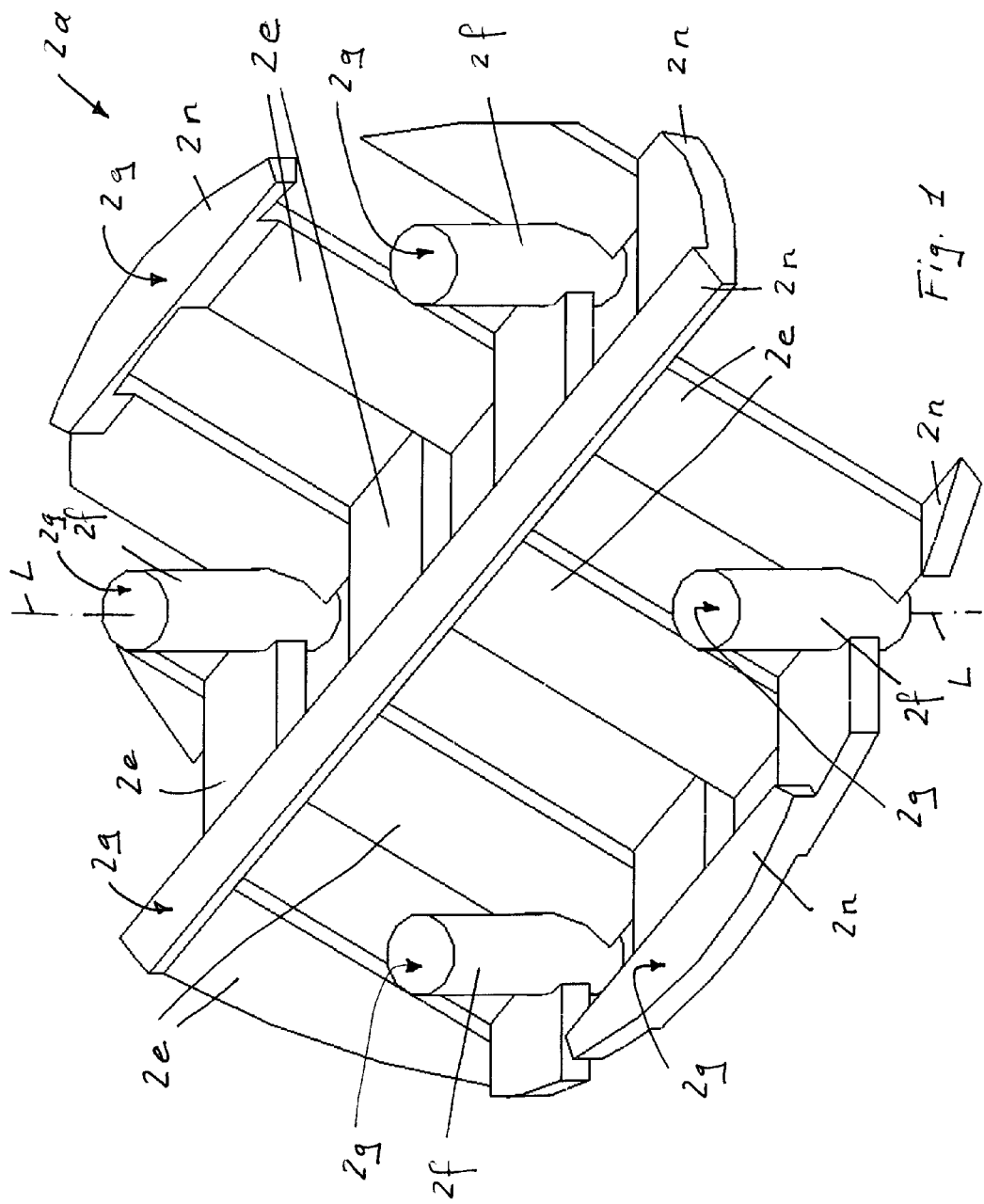
FIG. 1 a perspective view of a basic element.

FIG. 1 shows a basic element 2a having four longitudinal supports 2f extending in the longitudinal direction L, with each longitudinal support having, at each of its two end portions, a respective contact surface 2g extending perpendicular to the longitudinal direction L and also forming a point of contact 2g to a basic element 2a arranged lying next to it. All longitudinal supports 2f are of the same length. The basic element 2a has a plurality of bars 2e extending transverse to the longitudinal direction L.

Figure 2:
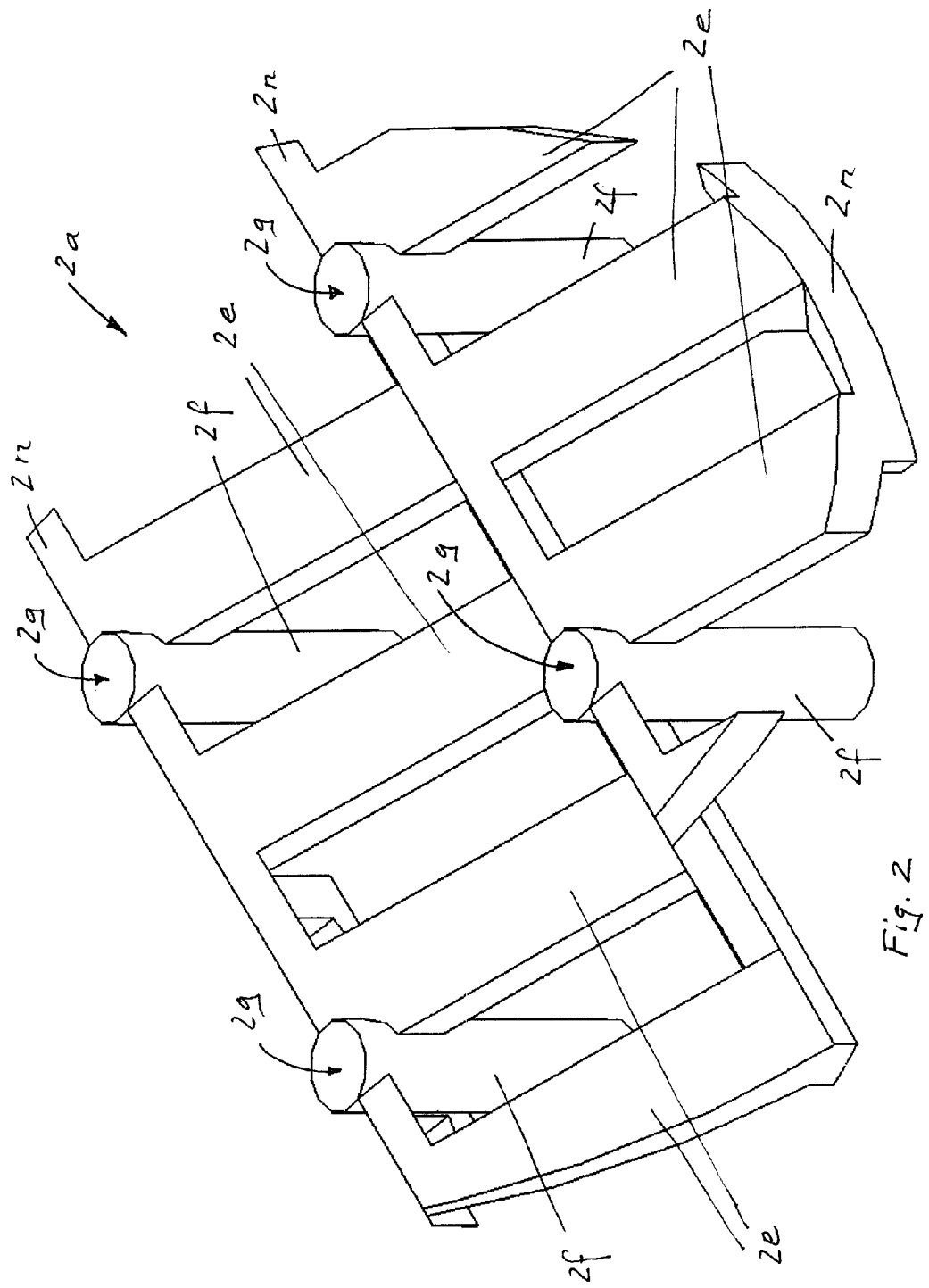
FIG. 2 a perspective view of the opposite side of the basic element of FIG. 1.

FIG. 2 shows the opposite side of the basic element 2a shown in FIG. 1. The same reference numerals represent the same elements.

Figure 3:
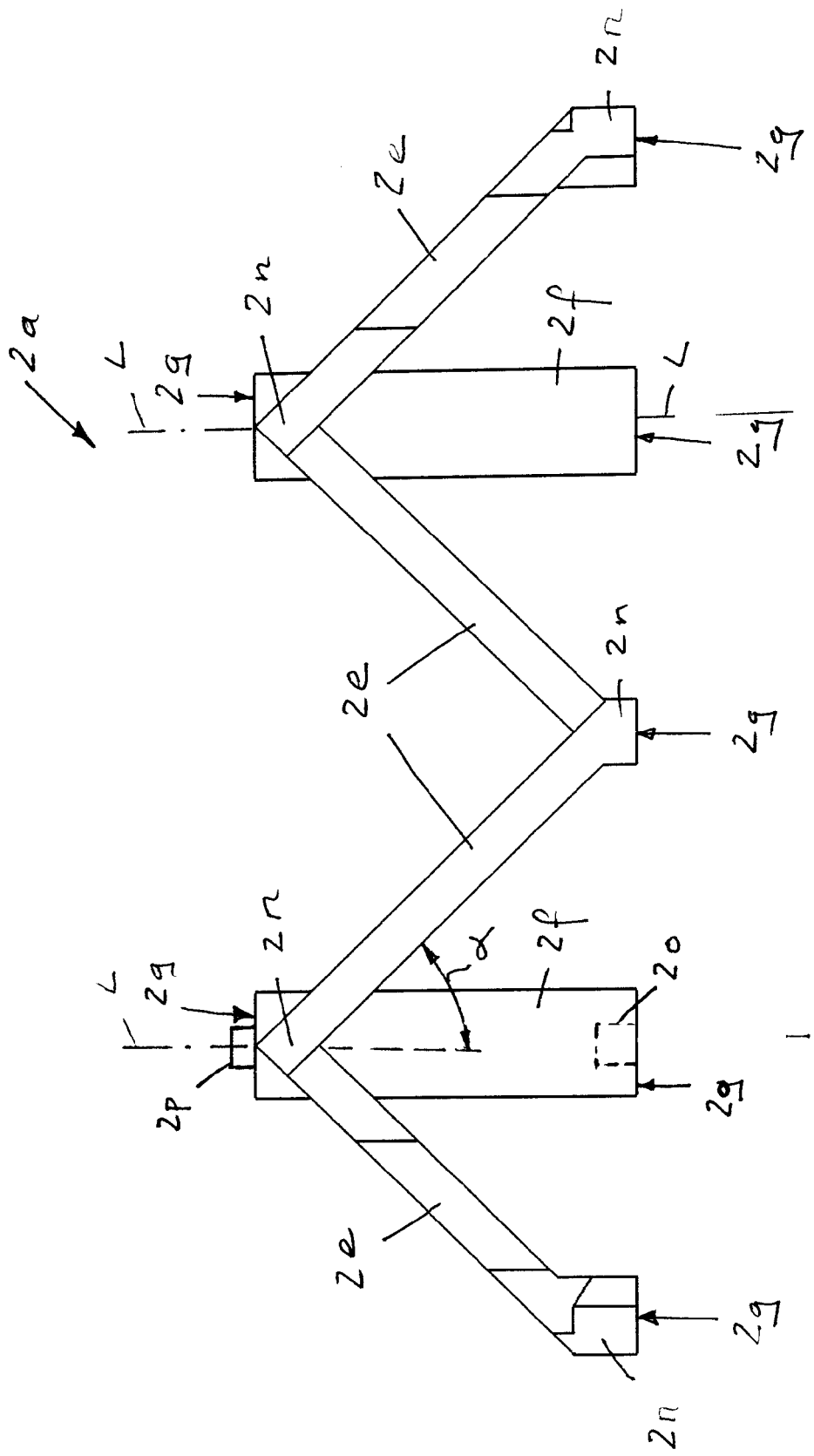
FIG. 3 a side view of the basic element of FIG. 1.

FIG. 3 shows the basic element 2a shown in FIG. 2 in a side view. The bars 2e extend with respect to the longitudinal direction L at an angle α of less than 90 degrees, that is to say transverse to the longitudinal direction L, preferably at an angle α in the range between 10 degrees and 80 degrees. The basic element 2a has five connecting webs 2n which extend perpendicular to the longitudinal direction L and into which bars 2e open and through which the bars 2e are mutually held together (with the exception of the outermost short boundary bars which are only held at one side). In an advantageous embodiment the connection webs 2n can also form contact surfaces 2f, as shown in FIGS. 1 and 3. It is evident from the view selected in FIG. 3 that the connection webs 2n disposed at the bottom form contact surfaces 2f in the illustrated embodiment, whereas the connection webs 2n arranged at the top do not form contact surfaces 2f. The contact surfaces 2f of the connection webs 2n and also the contact surfaces 2f of the longitudinal supports 2f preferably extend in a common plane as shown in FIG. 3. This arrangement has the advantage that the basic elements 2a can be simply arranged above one another or next to one another. The longitudinal support 2f could, as indicated in FIG. 3 at the left, also be provided with connection points 2p, 2o. The same connection points 2p, 2o, or in a similar embodiment, could also be present in the connection webs 2n.

The longitudinal supports 2f are preferably directly connected to the connection web 2n, as shown. The longitudinal supports 2f could, however, also only be connected to the bars 2e. The illustrated basic element 2a has four longitudinal supports 2f, which are arranged spaced apart in a square. The basic element 2a should have at least two longitudinal supports 2f and can thus, for example, also have three, five or even more longitudinal supports 2f.

Figure 5:
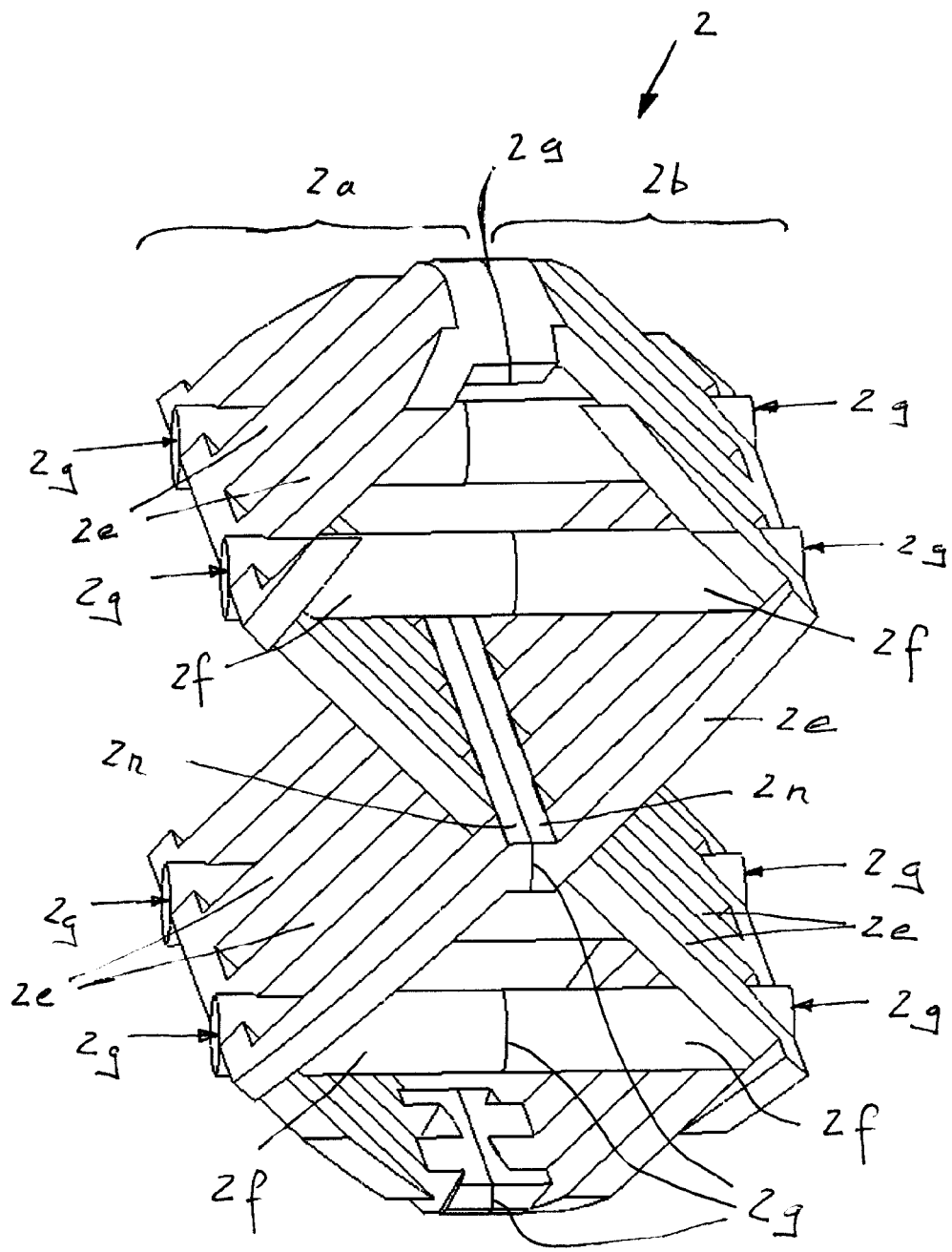
FIG. 5 a perspective view of two basic elements lying against one another.
Figure 6:
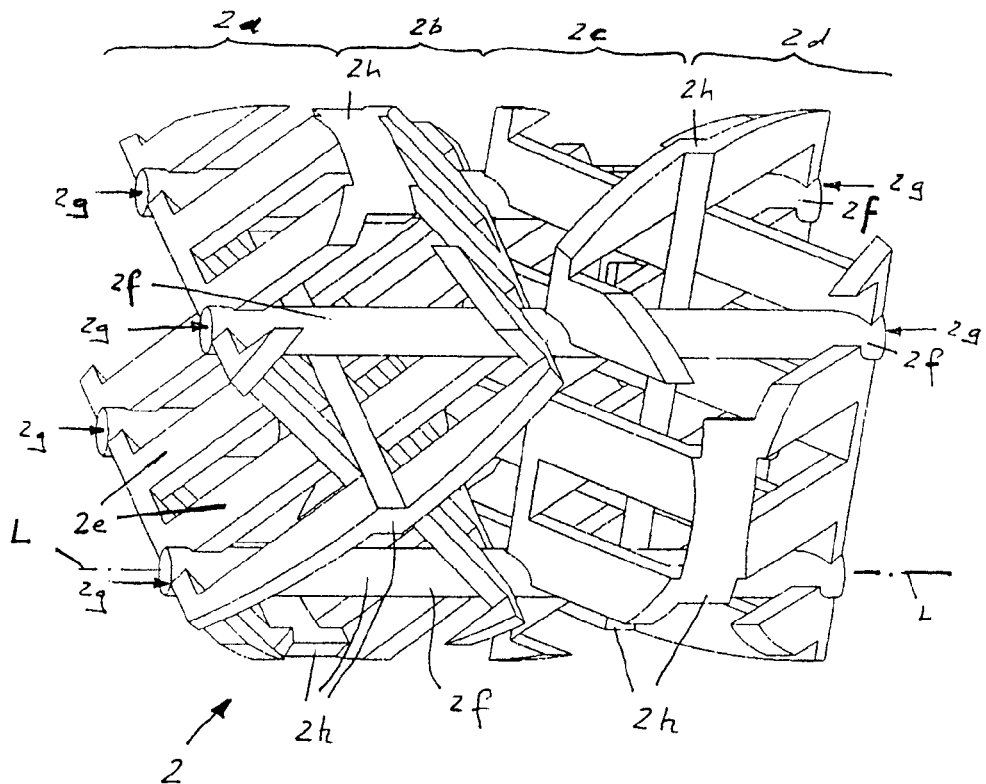
FIG. 6 a monolithic mixer insert including four basic elements.
Figure 7:
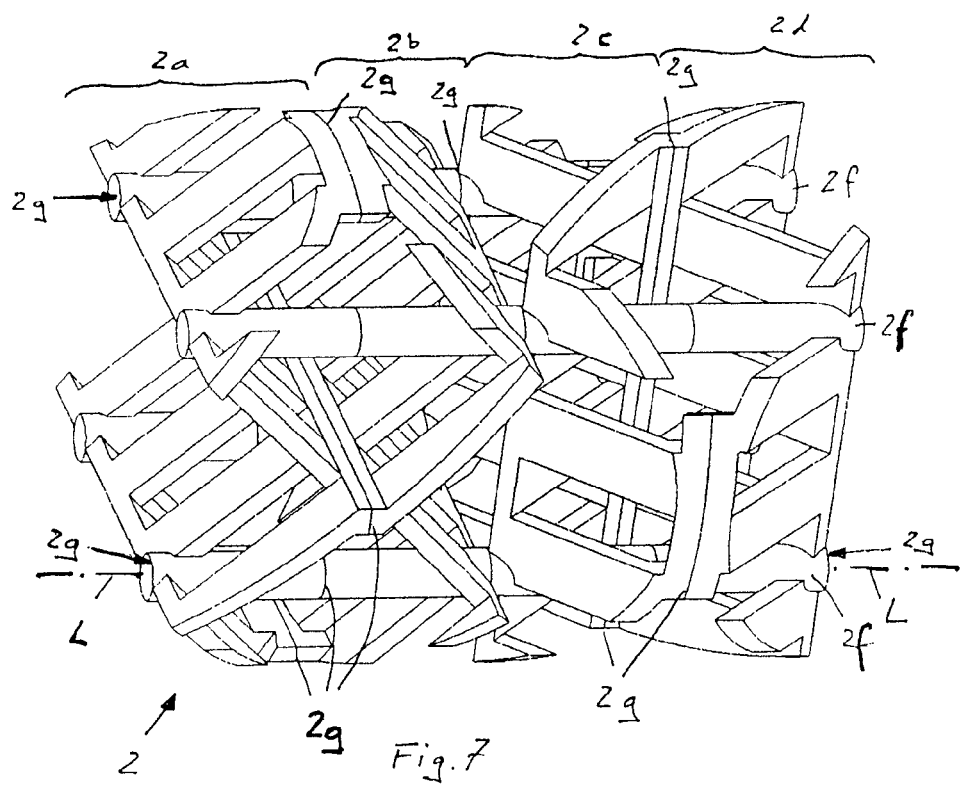
FIG. 7 a mixer insert including four connected basic elements.

The contact or support surfaces 2g of the longitudinal supports 2f and/or the contact or support surfaces 2g of the connection webs 2n are preferably arranged in such a way that, as shown in FIGS. 5, 6 and 7, a plurality of basic elements 2a, 2b, 2c, 2d can be arranged lying next to one another in the longitudinal direction L, with the basic elements 2a, 2b, 2c, 2d also being in mutual contact via the contact surfaces 2f. If the mixer insert 2 is formed as a metallic monolithic component, or of a curing casting resin such as a thermo-setting plastic, then the longitudinal supports 2f serve as supply passages for the liquid metal or for the casting resin and the support surfaces 2g form passage openings for the liquid metal. The longitudinal supports 2f, the bars 2e and the contact surfaces 2f are in this arrangement disposed such that all hollow cavities can be filled with the liquid metal. In an advantageous embodiment, all basic elements 2a, 2b, 2c, 2d have the same shape. In FIG. 5 the two basic elements 2a, 2b arranged next to one another in the longitudinal direction are mutually symmetrically arranged with respect to a plane extending perpendicular to the longitudinal direction L so that the basic elements 2a, 2b are in mutual contact both at the contact surfaces 2f of the longitudinal supports 2f, and also at the contact surfaces 2f of the connecting webs 2n. The basic elements 2a, 2b could however, depending on the mixing task that is intended, also be arranged next to one another in a plurality of different mutual alignments and numbers of bars 2e such that at least the contact surfaces 2f of neighboring longitudinal supports 2f in the longitudinal direction come to lie on one another. A plurality of basic elements 2a, 2b, 2c, 2d can be disposed lying next to one another in the longitudinal direction L and respectively contacting one another. Moreover, each basic element 2a, 2b, 2c, 2d can be arranged in a plurality of possible positions. Depending on the requirement, the mixer insert can thus be designed in a multitude of embodiments by a corresponding mutual arrangement of the basic elements 2a, 2b, 2c, 2d.

The basic elements 2a, 2b, 2c, 2d are, for example, manufactured of wax. The simple geometrical shape of the basic elements 2a, 2b, 2c, 2d makes it possible to manufacture them at favorable cost, for example with a simple two-part tool.

The mixer insert 2 is preferably manufactured by a lost-wax casting process, also termed a precision casting process (English: "Investment Casting"). For this purpose, the basic elements 2a, 2b, 2c, 2d are first manufactured of an easily fusible material such as wax. Thereafter, a plurality of basic elements 2a, 2b, 2c, 2d are arranged mutually touching one another in a longitudinal direction L. The basic elements 2a, 2b, 2c, 2d are thereafter clad with a material. Following this, a heating step takes place during which the basic elements 2a, 2b, 2c, 2d are removed by melting so that hollow cavities are formed by the no longer present basic elements 2a, 2b, 2c, 2d. These hollow cavities are filled with a material, in particular a ceramic material, a thermo-setting casting resin, or a liquid metal, so that a monolithic, preferably metallic mixer insert 2 arises which has substantially the specific form determined by the basic elements 2a, 2b, 2c, 2d.

FIG. 6 shows a mixer insert 2 manufactured in this wax, the shape of which is determined by four basic elements 2a, 2b, 2c, 2d. The four basic elements 2a, 2b, 2c, 2d originally consisting of wax now form a common, single, monolithic metal component. Connection points 2h have formed during the casting at the previous contact surfaces 2f which is why the basic elements 2a, 2b, 2c, 2d are now firmly connected to one another via these mutual connection points 2h. The basic elements 2a, 2b, 2c, 2d are preferably designed in such a way and arranged in such a way that, as shown in FIG. 6, longitudinal supports 2f are formed which extend over the full length of the mixer insert 2.

The basic elements 2a, 2b, 2c, 2d can be mutually arranged in the most diverse manner and can also be arranged next to one another in the longitudinal direction as shown in FIG. 6 so that the basic elements 2a, 2b and 2c, 2d are respectively aligned in the same way with respect to the longitudinal direction L or are mutually rotated relative to one another by an integral multiple of 90 degrees.

Figure 4:
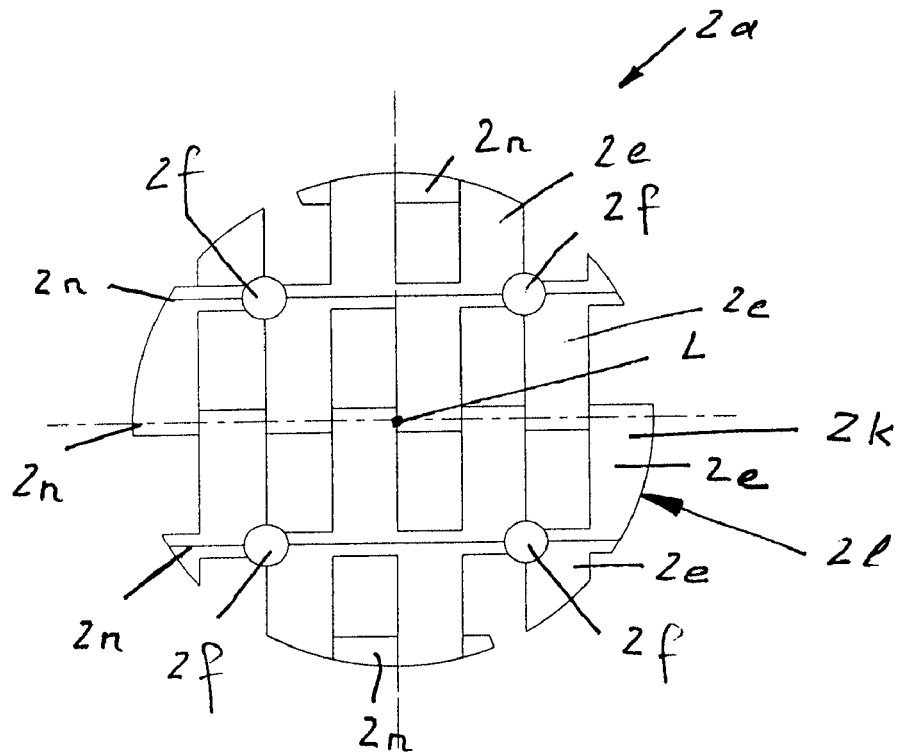
FIG. 4 a plan view of the basic element of FIG. 2.

FIG. 4 shows a plan view of the basic element 2a in accordance with FIG. 2. The basic element 2a or the mixer insert 2 includes a plurality of basic elements 2a, 2b, 2c, 2d arranged next to one another in the longitudinal direction L, has a cross-sectional area 2k and preferably a circularly extending outer contour 2l. In a preferred embodiment the longitudinal supports 2f extend within the cross-sectional area 2k and spaced apart relative to the outer contour 2l. The longitudinal supports 2f could, however, also be arranged such that they form part of the outer contour 2l from the view in accordance with FIG. 4. Since the mixer insert 2 is preferably designed as a monolithic metallic component, the outer contour 2l can be simply machined if it does not correspond to the desired requirements after the casting of the mixer insert 2 or does not have the desired outer contour 2l. Thus, it is for example very simple and possible at favorable cost to provide a mixer insert 2 with a circular or cylindrical outer contour 2l by subsequent machining.

The mixer insert 2 is preferably introduced into a tubular container 3. The container 3 could, however, also have a different cross-sectional shape, for example rectangular or square. The outer contour 2l of the mixer insert 2 is thus preferably machined such that a gap of narrow width results between the mixer insert 2 and the container wall 3. In this way the longitudinal flow which is not subjected to mixing can be considerably reduced. The mixer insert 2 can be machined in such a way that the outer contour 2l has a predeterminable gap width, in particular also a very small gap to the inner wall of the container 3.

FIG. 7 shows a mixer insert 2 consisting of four basic elements 2a, 2b, 2c, 2d which are fixedly connected together at their points of contact 2g. The basic elements 2a, 2b, 2c, 2d consist of a solid material, for example of metal, plastic (thermoplastic, thermo-setting plastic) or ceramic. The basic elements 2a, 2b, 2c, 2d are, for example, firmly connected to one another by adhesive bonding, soldering or welding via their common points of contact 2g. It can prove advantageous to provide the longitudinal supports 2f with connection points, such as projections 2p and recesses 2o, as shown in the left in FIG. 3. These connection points enable basic elements 2a, 2b, 2c, 2d to be arranged relative to one another in a precisely defined position.

In a further advantageous embodiment, the longitudinal supports 2f can also be designed as hollow cylinders, within which a clamping device such as a clamping screw is arranged in such a way that, for example in the mixer insert 2 of FIG. 7, it contacts against the outwardly facing contact surfaces 2f of the basic elements 2a and 2d and thereby exerts a pressing force on all basic elements 2a, 2b, 2c, 2d and holds these together. The ends 2g of the longitudinal supports 2f are so respectively shaped in a mixer, at the inlet side for the entry element and at the outlet side for the outlet element by machining, or already as a cast part, such that no disturbances or dead zones can arise flow-wise.

Figure 8:
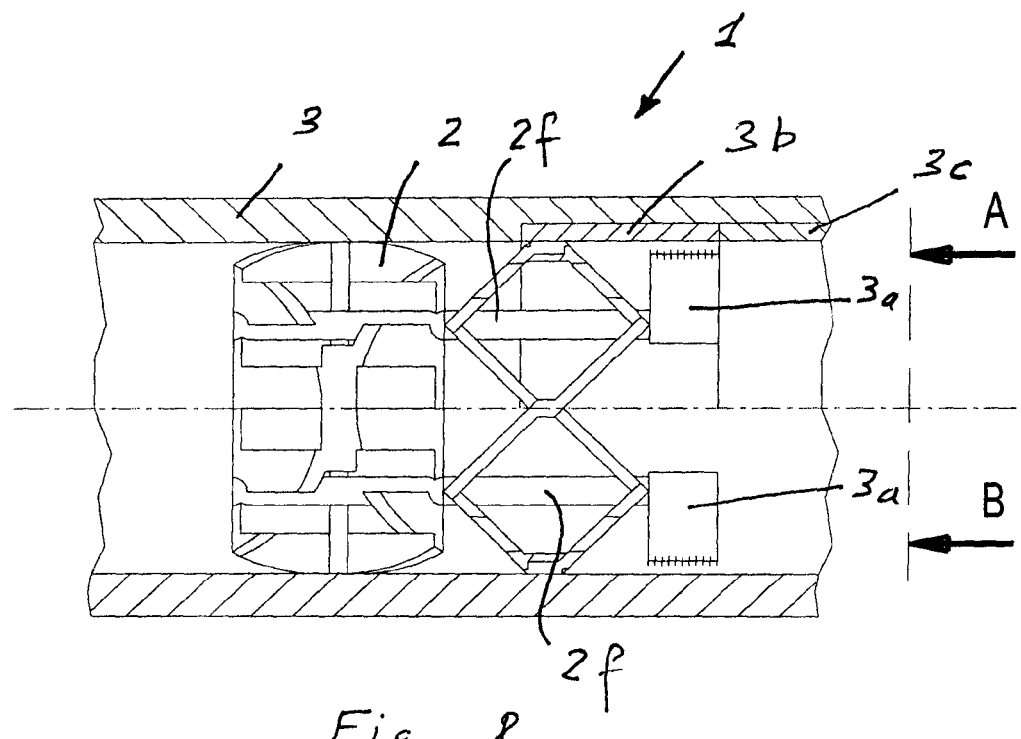
FIG. 8 a longitudinal section through a static mixer.
Figure 9:
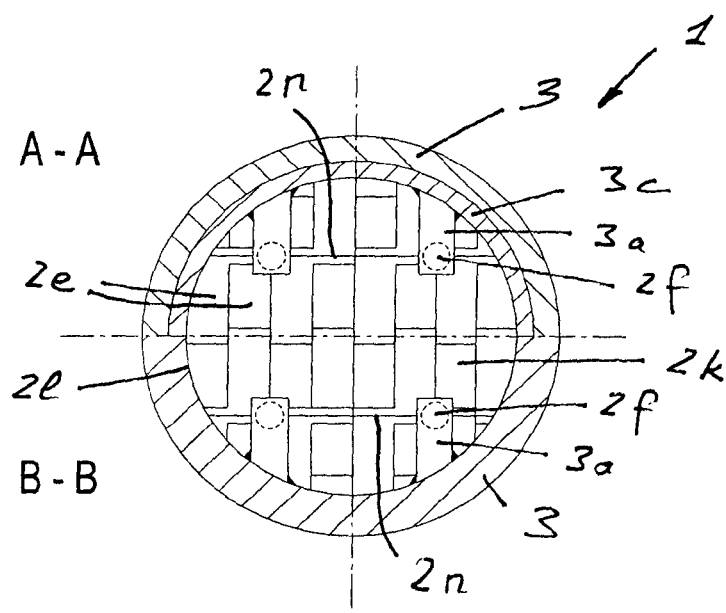
FIG. 9 a side view of the mixer in accordance with FIG. 8 from the direction of viewing A and B.

FIG. 8 shows in a longitudinal section a static mixing apparatus 1 including a tubular container 3, in which the mixer insert 2 shown in FIG. 6 or 7 is arranged. The pressure container 3 preferably has, at its inner side, supports 3a projecting into the inner space against which the mixer insert 2 lies. The projecting supports 3a have a flow favorable shape so that no throughflowing material can stick to them. FIG. 8 shows two embodiments of connections of the supports 3a to the pressure container 3. The embodiment at the top designated with A includes a sleeve 3b which can be inserted into the pressure container 3, with the support 3a being firmly connected to the sleeve 3b. A further only partly illustrated sleeve 3c is releasably connected to the container 3 and serves for the fixing and release of the sleeve 3b. In the embodiment shown at the bottom designated with B the support 3a is fixedly connected to the pressure container 3. The supports 3a are preferably arranged, as shown in FIGS. 8 and 9, in such a way that the longitudinal supports 2f contact the supports 3a. The longitudinal supports 2f thus serve, on the one hand, for the force transmission in the longitudinal direction L within the mixer insert 2 and, on the other hand, for the transmission of the forces acting on the mixer insert 2 to the container 3. This arrangement has the advantage that the mixer insert 2 can be removed from the container 3 and thus, for example, be checked or exchanged. The mixer insert 2 in accordance with the invention has the further advantage that it forms a self-supporting structure which can also take up large forces acting in the longitudinal direction L. the mixer insert 2 in accordance with the invention is thus very robust and is in particular also suited for the mixing of viscid media. The arrangement in accordance with FIG. 8 moreover has the advantage that the longitudinal force is essentially directed via the supports 3a to the pressure container 3 which has the consequence that the pressure container 3 only has to be designed at this point in such a way that the longitudinal forces can be taken up. At the remaining points, the pressure container 3 is preferably only exposed to small longitudinal forces.

FIG. 9 shows a side view of the mixing apparatus 1 shown in FIG. 8 from the direction of viewing A and B respectively. In the upper half, the sleeve 3c insertable into the container 3 can be seen, with the support 3a being held by the sleeve 3b as shown in FIG. 8. In the lower half it is evident that the support 3a is fixedly connected to the wall of the container 3. The mixer insert 2 can in particular be removed in simple manner from the container 3 and inserted again, in particular with the above illustrated embodiment illustrated at the top. In a preferred design the mixer insert 2 and also the inner diameter of the container 3 has a circular shape. These could, for example, also be of rectangular or square design.

Figure 10:
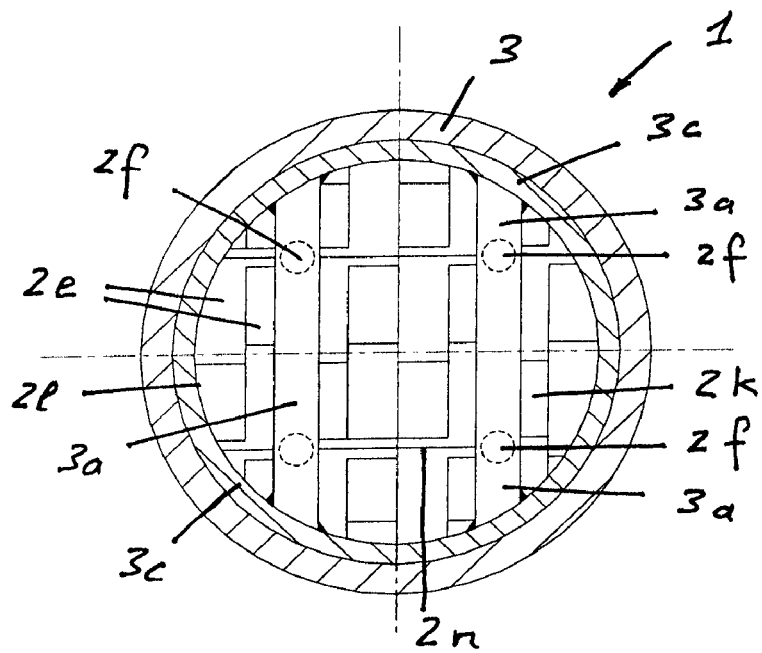
FIG. 10 a further side view of a mixer from the direction of viewing A.

FIG. 10 shows in a side view from the direction of viewing B a further embodiment of a mixing apparatus 1 which, in distinction to the embodiment shown in. FIG. 9, has a support 3a which is designed to extend throughout, that is to say which is connected at both ends to the insertable sleeve 3c. This throughgoing support 3a could also be fixedly connected to the container 3.

The invention claimed is:

1. A mixer insert (2) for a static mixer (1) wherein the mixer insert (2) extends in a longitudinal direction (L) and wherein the mixer insert (2) has a plurality of bars (2e) extending transverse to the longitudinal direction (L) as well as at least two longitudinal support structures extending in the longitudinal direction (L), characterized in that the static mixer insert (2) comprises a plurality of basic elements (2a, 2b, 2c, 2d) arranged in the longitudinal direction (L), with each of the basic elements (2a, 2b, 2c, 2d) including a longitudinal support element (2f) and wherein each of the basic elements (2a, 2b, 2c, 2d) and their respective longitudinal support elements (2f) are mutually arranged such as to form the longitudinal support structures, wherein the longitudinal support structures extend over the total length of the mixer insert (2), and wherein adjacent basic elements (2a, 2b, 2c, 2d) are fixedly connected to each other at least via mutual contact points (2g) at the longitudinal supports (2f).

2. The mixer insert (2) in accordance with claim 1, wherein the mixer insert (2) has a cross-sectional area (2k) extending perpendicular to the longitudinal direction (L) with an outer contour (2l) and wherein the longitudinal supports (2f) extend within the cross-sectional area (2k) and spaced apart from the outer contour (2l).

3. The mixer insert (2) in accordance with claim 2, characterized in that the mixer insert (2) consists of metal.

4. The mixer insert (2) in accordance with claim 1, wherein the basic elements (2a, 2b, 2c, 2d) are fixedly connected to each other via adhesive bonding, soldering or welding.

5. The mixer insert (2) in accordance with claim 1, wherein each of the basic elements (2a, 2b, 2c, 2d) have the same shape.

6. The mixer insert (2) in accordance with claim 1, wherein the basic elements (2a, 2b, 2c, 2d) arranged lying next to one another in the longitudinal direction (L) are mutually symmetrically disposed with respect to a plane extending perpendicular to the longitudinal direction (L).

7. The mixer insert (2) in accordance with claim 1, wherein the basic elements (2a, 2b, 2c, 2d) arranged lying next to one another in the longitudinal direction (L) are aligned in the same manner with respect to the longitudinal direction (L) or are mutually rotated by an integral multiple of 90°.

8. The mixer insert (2) in accordance with claim 1, characterized in that the mixer insert has a circular outer contour (2l).

9. The mixer insert (2) in accordance with claim 1, wherein the basic elements (2a, 2b, 2c, 2d) have connection webs (2n) extending perpendicular to the longitudinal direction (L) by which the majority of the bars (2e) are mutually firmly connected.

10. The mixer insert (2) in accordance with claim 9, wherein the connection webs (2n) have mutual contact points (2g) via which the basic elements (2a, 2b, 2c, 2d) arranged lying next to one another are connected together.

11. The mixer insert (2) in accordance with claim 1, having four longitudinal supports (2f) extending in the longitudinal direction (L).

12. The mixer insert (2) in accordance with claim 1 in which at least one of the basic element (2a, 2b, 2c, 2d) comprises a catalytically acting substance.

13. A static mixer (1) comprising a container (3) and a mixer insert (2) in accordance with claim 1 arranged within the container (3).

14. The static mixer (1) in accordance with claim 13, wherein the container (3) has inner side supports (3a) projecting into an inner space against which the mixer insert (2) lies.

15. The static mixer (1) in accordance with claim 14, wherein the supports (3a) are arranged on a movable part (3b) which can be fixedly connected to the container (3).

16. The static mixer (1) in accordance with claim 13, wherein the container (3) has supports (3a) which are designed and arranged such that longitudinal supports (2f) of the mixer insert come to lie on the supports (3a).

17. A method for the manufacture of a monolithic mixer insert (2) in accordance with claim 1, comprising a step of forming a plurality of basic elements (2a, 2b, 2c, 2d) from a fusible material are produced, such that the plurality of basic elements (2a, 2b, 2c, 2d) are arranged mutually contacting one another and lying alongside one another in a longitudinal direction (L), cladding the plurality of basic elements (2a, 2b, 2c, 2d) in a material, and melting the plurality of basic elements (2a, 2b, 2c, 2d) so that hollow cavities are formed in the material by the no longer present basic elements (2a, 2b, 2c, 2d), and providing a liquid material, which subsequently solidifies, to the hollow cavities such that a monolithic mixer insert (2) arises which has the form determined by the plurality of basic elements (2a, 2b, 2c, 2d).

18. The method in accordance with claim 17, characterized in that all basic elements (2a, 2b, 2c, 2d) have the same form and are arranged next to one another in the longitudinal direction (L) such that adjacent basic elements (2a, 2b, 2c, 2d) in the longitudinal direction (L) are differently aligned.

\* \* \* \* \*